C. R. BALLARD.
VALVE.
APPLICATION FILED JUNE 10, 1909.
949,208.
Patented Feb. 15, 1910.
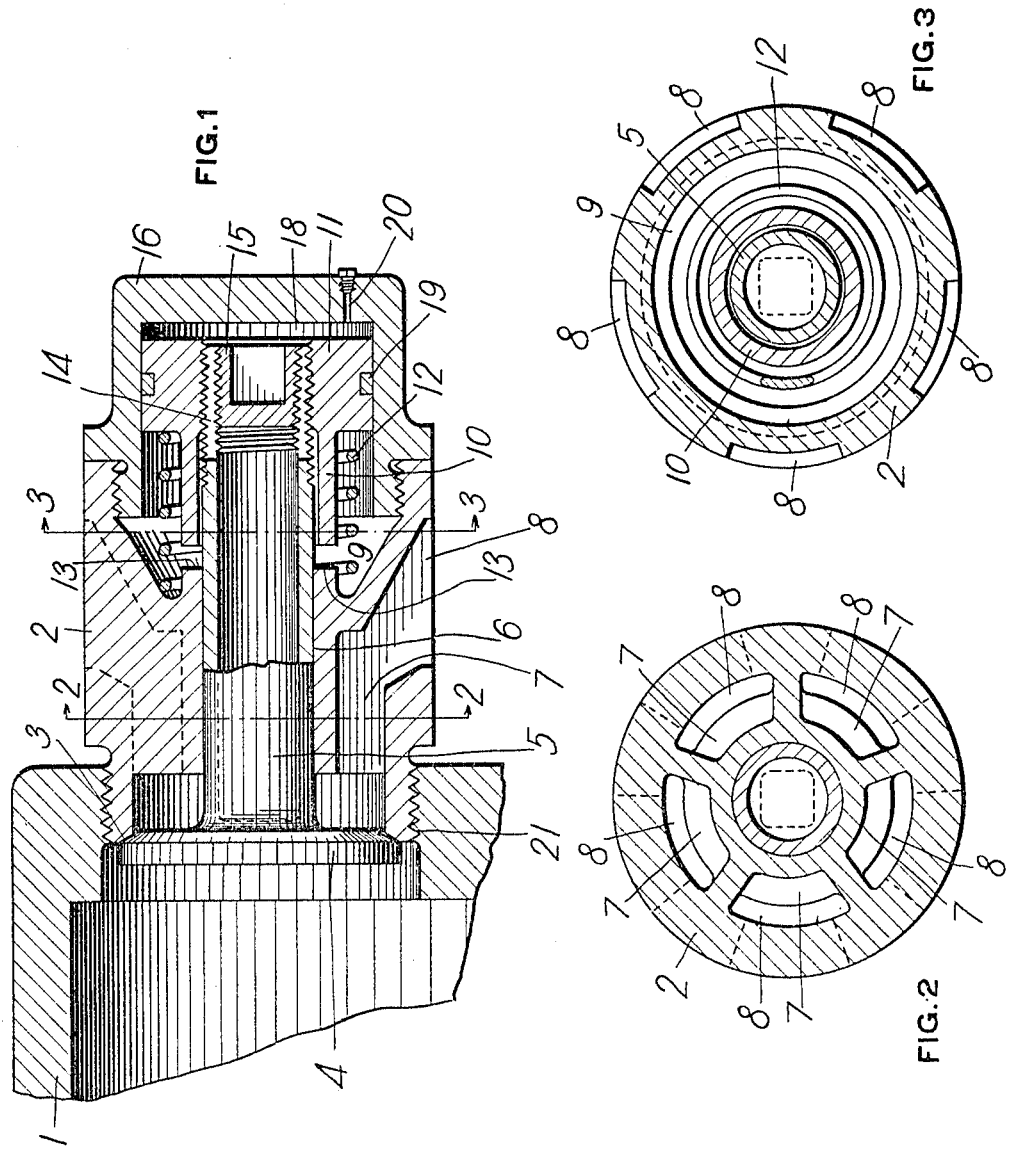
WITNESSES
Chas Joderman
Estelle M. Johnson
INVENTOR
Charles R. Ballard,
By Fred'k W. Winter
Attorney.

UNITED STATES PATENT OFFICE.

CHARLES R. BALLARD, OF MIDWAY, PENNSYLVANIA.

VALVE.

949,208.

Specification of Letters Patent. Patented Feb. 15, 1910.

Application filed June 10, 1909. Serial No. 501,266.

*To all whom it may concern:*

Be it known that I, CHARLES R. BALLARD, a resident of Midway, in the county of Washington and State of Pennsylvania, have invented a new and useful Improvement in Valves, of which the following is a specification.

This invention relates to inlet valves for compressors, pumps and the like.

The object of the invention is to provide a valve for this purpose of simple and durable construction, which is noiseless in its action, and in which the extent of opening can be varied, and which is so constructed that it can be very easily attached to and removed from the cylinder head.

The invention comprises a valve constructed and arranged as hereinafter described and claimed.

In the accompanying drawing Figure 1 is a longitudinal sectional view through the valve; Fig. 2 is a transverse section on the line 2—2, Fig. 1; and Fig. 3 is a similar view on the line 3—3, Fig. 1.

In the drawings 1 indicates a portion of the head of a cylinder of an air compressor, pump or similar apparatus. The inlet valve comprises a body 2 which may be formed as a casting and which at its inner end is open to the pump or compressor cylinder and is provided with a seat 3, with which coöperates a valve 4 provided with a stem 5 which is slidably mounted in an axial bore 6 of the body. Air inlet ports 7 surround the axial bore and open at the inner end of the valve body and extend outwardly and open through the sides of the body by inlet ports 8. The outer end of the body is provided with an enlarged flaring chamber 9 into which the outer end of valve stem 5 projects. The outer end of this stem is threaded and fitting thereon is a threaded sleeve or nut 10 having an enlarged head 11 which serves as the outer abutment of the spring 12 whose inner end is seated against the body of the valve, and which spring serves to hold the valve 4 to its seat. The end of the sleeve portion 10 is adapted to contact with the body at the point 13, and thus limits the extent of opening of valve 4. By adjusting the sleeve 10 on the valve stem the extent of the opening of valve 4 can be regulated as desired. In order to lock the sleeve or nut in its adjusted position on stem 5 the outer end of said stem is split, as indicated at 14, and is made hollow and internally threaded to receive a tapered threaded plug 15, which serves to spread the end of the stem and thus lock the nut against accidental rotation.

The outer end of the casing is closed by means of a cap 16 which, as shown, has a threaded engagement with the outer end of the body. The cap 16 provides a chamber 18 with which the head 11 of the sleeve 10 has a close fit, said cap and head forming a dash pot to steady and cushion the movements of the valve 14, and prevent the same from closing so suddenly as to cause a disagreeable noise. If desired the head 11 may be provided with an ordinary metal or other packing ring, as shown at 19, to give a tight fit in the dash-pot chamber, and if desired the end of the cap may be provided with a small leak port 20.

The valve body at its inner end is externally threaded as at 21 and is secured to the cylinder head 1 by merely screwing the same into a tapped opening therein. Consequently the valve can be very readily attached to and removed from the cylinder head without disturbing other parts, and permits of the use of a very simple cylinder head. The valve is of solid compact construction and is supported entirely at its inner end, so dispensing with the usually complicated arrangement for fastening the valve to or in the cylinder head. The air ports 7 are so located around the axial bore that none of the air and grit can work into said axial bore and wear the valve stem and its bearings. The outer end of the axial bore is practically sealed so that there is no tendency for the air to escape through the axial bore and around the stem. The extent of opening of the valve can be readily adjusted and the cushioning of the movement of the valve by the dash-pot makes it practically noiseless. There are no parts which can wear excessively or be easily injured.

What I claim is:

1. A valve for compressors, pumps and the like comprising a body provided at its inner end with a valve seat and with means for attachment to a cylinder head and provided with an axial bore and at its outer end with an enlarged recess and having inlet ports opening through its inner end and on its side faces but having no connection with the axial bore or the enlarged recess, a valve coöperating with the valve seat and provided with a stem slidable in the axial bore, a sleeve adjustably secured on the outer end of the stem and having a portion arranged to contact with the valve body to limit the opening of the valve and provided with a head, a cap closing the outer end of the body and providing a chamber having a close fit with said head to form a dash pot, and a spring surrounding said sleeve and interposed between the body and said head and arranged to close the valve.

2. A valve for compressors, pumps and the like comprising a body provided at its inner end with a valve seat and external threads for attachment to a cylinder head and provided with an axial bore and at its outer end with an enlarged recess and having inlet ports opening through its inner end and on its side faces but having no connection with the axial bore or the enlarged recess, a valve coöperating with the valve seat, a stem therefor slidable in the axial bore, a sleeve threaded on the outer end of the stem and having a portion arranged to contact with the valve body to limit the opening of the valve and provided with a head, a cap closing the outer end of the body and providing a chamber with which said head has a close fit and forming a dash-pot, and a spring arranged to close the valve.

In testimony whereof, I have hereunto set my hand.

CHARLES R. BALLARD.

Witnesses:
F. W. WINTER,
F. L. BEWERSDORF.